No. 744,434. PATENTED NOV. 17, 1903.
P. SYNNESTVEDT.
VEHICLE DRIVING MECHANISM.
APPLICATION FILED SEPT. 14, 1899. RENEWED SEPT. 30, 1901.
NO MODEL.
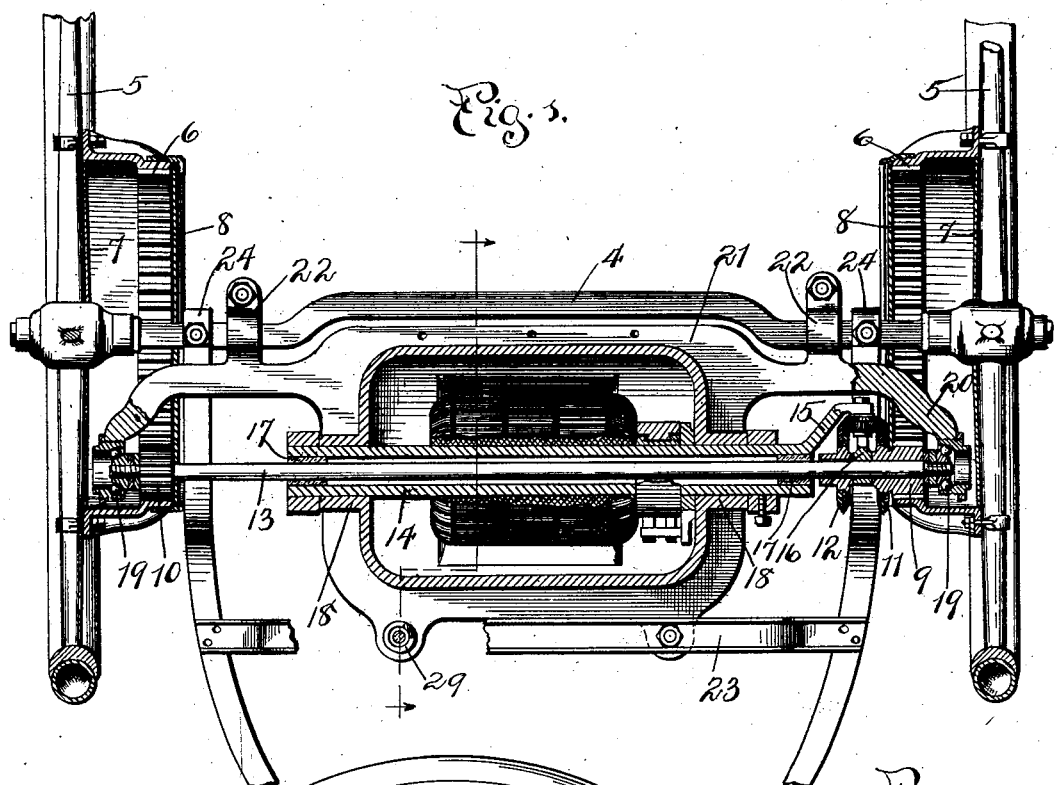

No. 744,434. Patented November 17, 1903.

UNITED STATES PATENT OFFICE.

PAUL SYNNESTVEDT, OF GLENVIEW, ILLINOIS.

VEHICLE-DRIVING MECHANISM.

SPECIFICATION forming part of Letters Patent No. 744,434, dated November 17, 1903.

Application filed September 14, 1899. Renewed September 30, 1901. Serial No. 77,142. (No model.)

*To all whom it may concern:*

Be it known that I, PAUL SYNNESTVEDT, a citizen of the United States, residing in Glenview, Cook county, Illinois, have invented a certain new and useful Improvement in Vehicle-Driving Mechanism, of which the following, taken in connection with the accompanying drawings, is a specification.

My invention relates to self-propelled vehicles, and is particularly designed for use in connection with electric-motor vehicles, although as to some features of the construction the type of motor employed is immaterial and other well-known forms could be substituted, if preferred, without departing from the spirit of my invention.

The first of the objects of my invention is to simplify the construction, increase the strength and durability, and reduce the friction and lower the cost of production of differential gearing such as is used on motor-vehicles to permit the driving-wheels to run at different speeds relative to each other, as in turning a corner.

Another object of my invention is to provide a vehicle of the type specified having a fixed axle, a pair of driving-wheels rotatable on said axle, a vehicle-frame supported upon the axle, a motor, and a shaft for said motor, said shaft being carried in four brackets or bearing-supports, one on each side of and adjacent to the driving part of the motor proper and one at each end of said shaft, the latter two being carried in brackets which are rigidly attached to or integral with the brackets which support the two intermediate bearings.

Another object of my invention is the provision of a construction similar to that just described in which the shaft thereof comprises an inner rod, which may be tubular or solid, as preferred, carried at each of its ends by one of the two outermost bearings above described and having a driving-tube surrounding said rod, which is carried by intermediate bearings and arranged to drive a differential gear, one side of which is rigidly attached to the rod to drive one of the driving-wheels and the other side of which is connected with means, such as a sprocket wheel or pinion, for driving the other of said driving-wheels.

A further object of my invention is the provision of a construction of the type described in which the four bearings above mentioned are carried in brackets all integral with the main and preferably the upper part of the motor-casting, the other, and in the preferred form the lower, part of the motor-casting being hinged thereto. The two intermediate bearings in this construction I prefer to make separable upon a horizontal plane, while the two outer bearings are independent of the intermediate bearings and arranged so that through the central rod of the motor-shaft the entire revolving part of the motor will be sustained in position adjacent to the upper or main casting when the lower part is removed.

A further object of my invention is the provision of a construction having a fixed axle, two driving-wheels rotatable on said axle, a motor, an internal gear upon each of said driving-wheels, a pinion meshing with each of said gears carried upon the outer end of said motor-shaft, and a bracket-arm extending through or within said internal gear, so as to support the bearing which carries the outer ends of said shaft at a point beyond the pinions.

The above, as well as such other objects as may hereinafter appear, I attain by means of the construction shown in the accompanying drawings, in which—

Figure 1 is a plan view, partly in section, showing a vehicle having my invention applied thereto and illustrating by preference an electric motor as the driving means, although, as I have already stated, other forms of driving-motor are applicable and could be substituted, if preferred, without departing from the spirit of my invention. Fig. 2 is a side elevation, also partly in section, showing one of the driving-wheels and the method of suspending the motor and driving-gear; and Fig. 3 is a view showing a detail of the outer bracket-arm, which carries the outermost bearing at each end of the motor-shaft.

Referring now more particularly to Fig. 1, it will be seen that I have provided, first, a fixed axle 4, upon each end of which is rotatably mounted a driving-wheel 5. To the spokes of the wheels are attached a couple of internal gears 6, protected from dirt and injury by a plate 7, attached to the inside of the spokes, and a plate 8, which does not rotate with the wheel. Meshing with the gears 6 are two pinions 9 and 10. The pinion 9 is arranged to be driven by one side member 11 of a differential gear, the other side member 12 of which is keyed to or fixed upon an inner rod 13, the other end of which carries and drives the pinion 10. The side member 11 is loose upon the rod. Surrounding the rod 13 is a tube 14, to which is attached the driving part of a motor, the force of the latter being transmitted through the tube and the branch part 15 to the central portion or member 16 of the differential gear. The tube 14 is preferably of an internal diameter somewhat greater than the external diameter of the rod 13, but has bearings or journals upon the latter at the points 17.

The tube 14 is carried in bearings 18, one at each side of the motor proper, and the rod 13 is carried by bearings 19 beyond the ends of the tube, mounted in bracket-arms 20, which, as shown, are securely attached to or integral with the same part of the motor-casting that carries the bearings 18.

In carrying out my invention I prefer to make the brackets which carry the four bearings integral with the upper half 21 of the motor-casting and to provide the same with a couple of supporting brackets or arms 22, one adjacent to each end of the fixed axle. The opposite side of the motor-casting 21, carrying the four bracket-arms, is spring-supported from a part 23 of the main frame of the vehicle, the latter being preferably supported upon the axle 4 at points 24 between the arms 22 and the driving-wheels, because the large weight carried by the vehicle is thus brought nearest to the point of support and has the least tendency to bend the axle.

It is to be observed that the bearings 19 are outside or beyond the driving-pinions of the motor-shaft and that the bearings 18 are intermediate said pinions. By the use of an internal gear combined with the other parts, as I have now described them, I am enabled to extend the brackets 20 directly out toward the spokes of the wheel and within or through the internal gear, and thereby get a rigid and stable support for the bearings 19. While in this particular I have shown the construction which I prefer, it is also possible to combine some of the features of my invention with a device having an external gear or even a sprocket-wheel, the bracket-arm 20 being caused to pass around the motor-shaft, differential, and pinion, so as to reach and support the bearing 19 in the same position relative to the pinion and shaft as it is shown in Fig. 1 of the drawings hereto annexed.

At 19 I prefer to employ a ball-bearing, which can be made substantially as shown in the drawings, one of the cones having screw-threaded attachment to the end of the shaft or rod 13, and the other being screwed into the bracket 20. In the construction which I have shown it is obvious that if it is necessary to remove the wheel all that will be required will be to loosen a nut at the hub and to pull the wheel off, the gear 6 drawing off from the pinion without difficulty and being permitted to pass the bracket 20, (if the pinion is small in diameter, by cutting away a portion of the bracket in the manner clearly shown in Fig. 3, along the line 25.)

In Fig. 2 I have illustrated more specifically the relation between the two parts of the motor-casting, the upper or main part 21 carrying the two upper poles and the lower part 26 being hinged to the upper at 27 and secured at the opposite side by the bolts 28, the outer end of the whole being yieldingly supported from the part 23 of the frame by means of the springs 29 and 30. By this construction not only are the motor and its driving-pinion permitted to yield slightly with reference to the driven gear, but the outside or bracket-carried bearings 19 are also allowed to yield along with the motor and the bearings 18, and the whole are thereby kept in accurate alinement. Heretofore where motor-shafts have been employed mounted in four bearings it has been customary to support said bearings directly upon the frame of the vehicle without spring suspension. By my invention I retain the benefits of the ordinary spring-suspension device as applied to the motor proper and am also enabled to use end supporting-bearings for the shaft in addition to the usual motor-bearings, all four bearings being at all times in rigid and accurate alinement.

Having thus described my invention, what I claim as new, and desire to secure by Letters Patent, is—

1. In a differential gearing, a shaft comprising a tube carrying the central member of the differential gear, a rod journaled in the tube, one side member of the differential gear being fixed upon the rod and the other side member thereof being loose upon the rod, bearings for the tube and bearings for the rod beyond the ends of the tube.

2. In a differential gearing, a shaft comprising a tube carrying the central member of the differential gear, a rod journaled in the tube, one side member of the differential gear being fixed upon the rod and the other side member thereof being loose upon the rod, bearings for the tube and bearings for the rod beyond the ends of the tube, said bearings being rigidly connected together.

3. In a differential gearing, a shaft comprising a tube carrying the central member of the differential gear, a rod journaled in the tube, one side member of the differential gear being fixed upon the rod and the other side member thereof being loose upon the rod, bearings for the tube and bearings for the rod beyond the ends of the tube, and means for driving the tube.

4. A vehicle-driving mechanism comprising a fixed axle, two driving-wheels rotatable on said axle, a motor, a motor-shaft, a main motor-casting, four bearings for said shaft all rigidly carried by said main motor-casting, substantially as described.

5. A vehicle-driving mechanism comprising a fixed axle, two driving-wheels rotatable on said axle, a motor, a motor-shaft, a main motor-casting, four bearings for said shaft all rigidly carried by said main motor-casting, and a spring suspension for the motor-casting, substantially as described.

6. A vehicle-driving mechanism comprising a fixed axle, two driving-wheels rotatable on said axle, a motor, a shaft comprising a single inner rod and a driving-tube surrounding said rod arranged to drive a differential, one side whereof is rigidly attached to the rod to drive one wheel, and the other side whereof is connected with driving means for driving the other wheel.

7. In a vehicle-driving mechanism, the combination of an axle, two driving-wheels thereon, a motor, a motor-shaft and bearings at each of the outer ends of said shaft, two bearings intermediate said outer bearings, the four bearings being carried by rigidly-united brackets, substantially as described.

8. In a vehicle-driving mechanism the combination of a fixed axle, two driving-wheels rotatable on said axle, a gear for each of said driving-wheels, a motor-shaft, a pinion upon each end of said shaft arranged to drive said gears, and bearings for the shaft outside of said pinions, substantially as described.

9. A vehicle-driving mechanism comprising a fixed axle, a driving-wheel rotatable on said axle, a gear on said wheel, a driving-shaft, a pinion carried by said shaft to drive said gear, a bearing for the shaft between the pinion and the wheel, and a support for said bearing extending within the gear, substantially as described.

10. A vehicle-driving mechanism comprising a fixed axle having two driving-wheels, a gear mounted upon each of said driving-wheels, a motor-shaft, a differential gear, a pinion or driving wheel upon each end of said shaft arranged to drive the gears on the wheels, and bracket-arms carrying bearings for said shaft outside of said pinions, substantially as described.

11. A vehicle-driving mechanism comprising a fixed axle, two driving-wheels rotatable on said axle, a motor, and a shaft for said motor comprising an inner rod and driving-tube arranged to drive a differential, one side whereof is rigidly attached to the rod to drive one wheel, and the other side whereof is connected with means for driving the other wheel, a bearing at each end of said rod, bearings for said tube intermediate said end bearings, a main motor-casting, and brackets integral with said main motor-casting for carrying said bearings.

12. A vehicle-driving mechanism comprising a fixed axle, two driving-wheels rotatable on said axle, a motor, and a shaft for said motor comprising an inner rod and driving-tube arranged to drive a differential, one side whereof is rigidly attached to the rod to drive one wheel, and the other side whereof is connected with means for driving the other wheel, a bearing at each end of said rod, bearings for said tube intermediate said end bearings, a main motor-casting, brackets integral with said main motor-casting for carrying said bearings, supporting-arms adjacent to each wheel carrying one side of said motor, and spring supporting devices for carrying the other side of said motor, substantially as described.

13. A vehicle-driving mechanism comprising a vehicle-frame, a fixed axle, a driving-wheel rotatable on said axle, a rigid frame carrying a driving-shaft and motor, with outside bearing for said driving-shaft, one end of said driving-shaft frame being attached directly to said axle, the other end of said driving-shaft frame being spring-supported from the fixed vehicle-frame, and a driving connection from said driving-shaft directly to said driving-wheel.

14. The combination with a fixed axle and rotatable wheels thereon, of a shaft having bearings at both ends, and having a connection at one end directly to one of said wheels and being provided on the other end with a sleeve connected to the other of said wheels, a second sleeve on said shaft carrying a motor-armature and a differential gear to drive said shaft and driving-sleeve respectively, whereby the vehicle-wheels may be driven at different speeds, substantially as described.

15. A vehicle-driving mechanism comprising a vehicle-frame, a fixed axle, a motor-frame, a driving-shaft on said motor-frame carrying a pinion with outside support therefor, a driving-wheel on said fixed axle, a driving connection between said pinion and the wheel, said motor-frame being separate from the frame of the vehicle and being spring-connected at one end to the vehicle-frame independent of the vehicle-body, and directly supported on the axle at the other end.

16. The combination with a fixed vehicle frame and axle, of a motor-frame pivoted to the axle and spring-supported from the vehicle-frame, and a motor in the motor-frame mounted on a continuous driving-shaft having two end and two intermediate bearings in the frame, rigidly connected and connections from said driving-shaft to the wheels.

17. The combination with a vehicle having a fixed axle and a frame rigidly supported thereon, of a supplementary motor-frame pivotally attached to said axle and spring-supported from said vehicle-frame, said motor-frame being provided with a driving-shaft supported entirely within said frame and having supports at its outer ends, and driving connections immediately operating upon the wheels of the vehicle, substantially as described.

PAUL SYNNESTVEDT.

Witnesses:
 PAUL CARPENTER,
 CORA IRENE GOOD.